(No Model.)

C. D. TOWNE.
ELEVATOR FOR HARVESTING MACHINES.

No. 416,764. Patented Dec. 10, 1889.

Witnesses:
Walter S. Wood
S. N. Burke

Inventor.
Charles D. Towne
By Lucius C. West
Att'y

UNITED STATES PATENT OFFICE.

CHARLES D. TOWNE, OF GALESBURG, MICHIGAN.

ELEVATOR FOR HARVESTING-MACHINES.

SPECIFICATION forming part of Letters Patent No. 416,764, dated December 10, 1889.

Application filed February 1, 1889. Serial No. 298,368. (No model.)

*To all whom it may concern:*

Be it known that I, CHARLES D. TOWNE, a citizen of the United States, residing at Galesburg, county of Kalamazoo, State of Michigan, have invented a new and useful Elevator for Harvesting-Machines, of which the following is a specification.

This invention relates to that class of elevators which are employed on the platform upon which the grain or other vegetation falls when cut by the knives of the cutter-bar for moving it laterally on said platform and up the incline thereof to the place where it is collected into a bundle.

While the elevator may be employed in ordinary grain-reaping machines for elevating the grain, I have more particularly designed it for a corn-harvester.

The object of this invention consists in the peculiar construction of a series of alternately-reciprocating rakes and combining them with the horizontal and inclined part of the platform, all as more fully described and claimed below.

Figure 1:
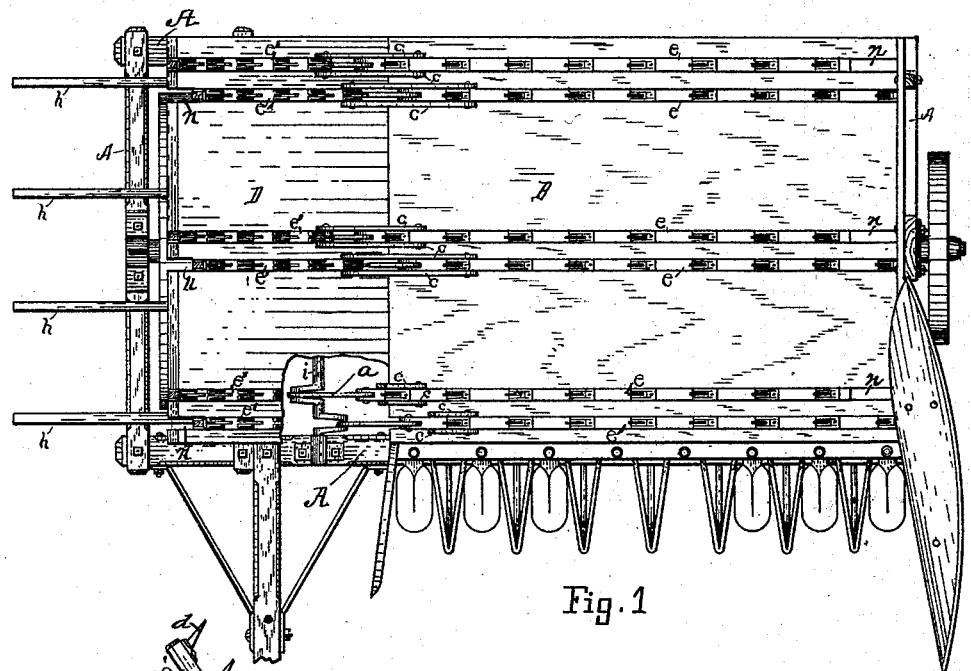
Figure 2:
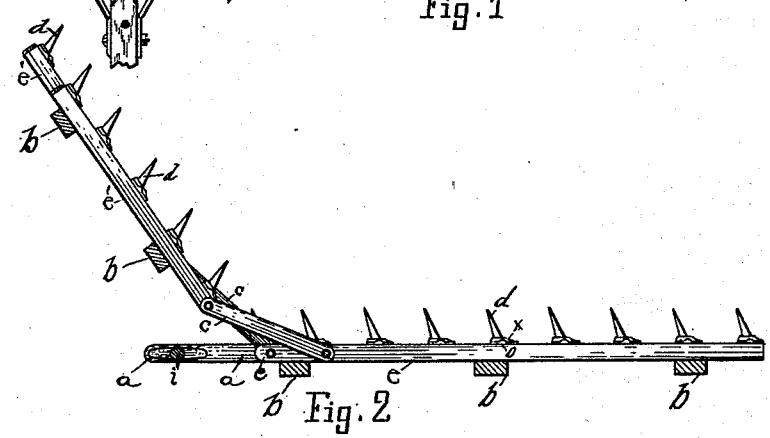
Figure 3:
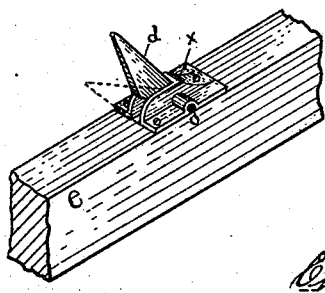

In the drawings forming a part of this specification, Figure 1 is a plan view; Fig. 2, an enlarged section taken on a line with one of the reciprocating rakes; and Fig. 3 is an enlarged broken detail of parts in Fig. 2 in perspective.

Referring to the lettered parts of the drawings, A A is the frame of the platform, which platform consists of the horizontal part B and the upwardly-inclined part D. The reciprocating rakes consist of the toothed bar $e$ on the horizontal part B of the platform, the inclined bar $e'$ (also bearing teeth) on the oblique part D of the platform, and the strap or link $c$ at an angle less than the oblique angle of the bar $e'$ and greater than the horizontal angle of the part B of the platform. These parts $e$, $e'$, and $c$ are end to end with each other, the strap $c$ being between the toothed bars $e$ $e'$, and is jointedly attached or hinged at each end to the ends of the bars $e$ $e'$. By means of the connecting strap or link $c$ at the oblique angle, as described, when reciprocating motion is imparted to the horizontal bar $e$ it will be transmitted to the inclined bar $e'$, and both toothed bars $e$ $e'$ will move in their respective angles without cramping and undue friction. As many of these reciprocating rakes may be employed as desired. Six are here shown, Fig. 1. When three alternating rakes move to the left, Fig. 1, the corn or grain is carried in that direction the distance of said movement by the teeth $d$, which are thrown up by contact with the corn or grain, as in Figs. 2 and 3. While this action is taking place, the other rakes, which alternate with those just described, move to the right from beneath the corn or grain, and their teeth are tilted down by contact of their back edges with the corn or grain. Thus the alternate reciprocating movements of the sets of rakes finally deliver the grain or corn over the top of the inclined part D of the platform onto the carrier-arms $h$. As here shown, the rakes rest on the cross-bars $z$ of the platform in the spaces $n$; or the platform may be provided with grooves or channels in lieu of these spaces. The teeth $d$, the action of which is above described, are pivoted in a vertical opening in the castings $x$ at $o$. The back wall of these castings prevents the teeth from tilting too far back during the forward movement of the rakes, while the front limit to the tilting of the teeth is the bar to which the casting is attached. (See dotted tooth $d$ in Fig. 3.) In this figure the tooth $d$ is something in the form of a scalene triangle; but this is not essential, and even the casting $x$ may be dispensed with, so long as suitable teeth are pivoted to the bars of the rakes in a manner to tilt and be limited in their movements, as described. The rakes may be made of wood or metal.

In Fig. 1 is shown a shaft $i$, having a series of double cranks. A portion of the platform is broken away, showing two of the cranks. The front end of the horizontal part $e$ of the rakes are individually attached to the respective cranks by bars $a$, pivoted at one end to the cranks and at the other end to the rakes. Other suitable means may be employed to effect the described movements of the reciprocating alternating sets of rakes.

Having thus described my invention, what I claim, and desire to secure by Letters Patent of the United States, is—

The combination of the platform consisting of the horizontal and the upwardly-inclined parts, the alternately-reciprocating rakes, each consisting of a horizontal bar having pivoted teeth, the inclined bar having pivoted teeth, and a connecting strap or link between the contiguous ends of said bars and being at an oblique angle less than that of the inclined tooth-bar, and driving mechanism connected to one of the toothed bars of the rakes, substantially as set forth.

In testimony of the foregoing I have hereunto subscribed my name in presence of two witnesses.

CHARLES D. TOWNE.

Witnesses:
L. L. BENSON,
E. B. DAY.